(12) United States Patent
Fuderer et al.

(10) Patent No.: US 7,523,813 B2
(45) Date of Patent: Apr. 28, 2009

(54) BRAKE APPLICATION DEVICE COMPRISING AN ELECTRICALLY ACTUATED WEAR ADJUSTER

(75) Inventors: Erich Fuderer, Fürstenfeldbruck (DE); Peter Wolfsteiner, München (DE); Thomas Wagner, München (DE); Manfred Vohla, Vienna (AT)

(73) Assignee: Knorr-Bremse Systeme für Schienenfahrzeuge GmbH, München (DE)

( * ) Notice: Subject to any disclaimer, the term of this patent is extended or adjusted under 35 U.S.C. 154(b) by 126 days.

(21) Appl. No.: 10/510,038

(22) PCT Filed: Mar. 31, 2003

(86) PCT No.: PCT/EP03/03315

§ 371 (c)(1),
(2), (4) Date: Sep. 20, 2005

(87) PCT Pub. No.: WO03/082650

PCT Pub. Date: Oct. 9, 2003

(65) Prior Publication Data

US 2006/0070830 A1 Apr. 6, 2006

(30) Foreign Application Priority Data

Apr. 3, 2002 (DE) ................. 102 14 670

(51) Int. Cl.
*F16D 55/02* (2006.01)
*F16D 43/20* (2006.01)

(52) U.S. Cl. ............. 188/71.8; 188/71.9; 188/72.1; 188/196 D; 188/196 F; 188/196 R; 188/162; 188/203; 192/56.6; 192/66.2; 192/94; 464/39; 464/42; 464/44

(58) Field of Classification Search ........... 188/196 D, 188/196 F, 196 R, 72.1, 162, 203, 71.8; 464/30, 464/39, 44, 42; 192/66.2, 94
See application file for complete search history.

(56) References Cited

U.S. PATENT DOCUMENTS

| 3,955,480 | A |   | 5/1976 | Wosegien |
| 4,005,767 | A | * | 2/1977 | Farello ............... 188/203 |
| 4,006,801 | A |   | 2/1977 | Bayliss |
| 4,018,140 | A |   | 4/1977 | Engle |
| 4,113,070 | A | * | 9/1978 | Paginton ............ 188/196 F |
| 4,234,062 | A |   | 11/1980 | Kerscher et al. |
| 4,431,089 | A |   | 2/1984 | Nadas et al. |

(Continued)

FOREIGN PATENT DOCUMENTS

| DE | 33 26 374 A1 |   | 1/1985 |
| DE | 3423510 A1 |   | 1/1986 |
| DE | 197 31 696 A1 |   | 2/1999 |
| DE | 19945701 A1 |   | 4/2001 |
| EP | 0 699 846 A2 |   | 3/1996 |
| GB | 2312717 A | * | 11/1997 |

OTHER PUBLICATIONS

German Office Action dated Jan. 27, 2006, (4 pages).

*Primary Examiner*—Robert A Siconolfi
*Assistant Examiner*—Mahbubur Rashid
(74) *Attorney, Agent, or Firm*—Barnes & Thornburg LLP

(57) ABSTRACT

A brake application device for vehicles, in particular rail vehicles, which comprises a wear adjuster that is configured as a brake actuator with a screw drive, having a threaded spindle and a nut that can be screwed onto said spindle as the screw parts. At least one of the screw parts is electrically actuated for wear adjustment.

18 Claims, 3 Drawing Sheets

U.S. PATENT DOCUMENTS

| | | |
|---|---|---|
| 4,546,297 A | 10/1985 | Washbourn et al. |
| 4,557,355 A | 12/1985 | Wilke et al. |
| 4,592,451 A | 6/1986 | Persson |
| 4,651,852 A | 3/1987 | Wickham et al. |
| 4,760,895 A | 8/1988 | Wickham |
| 4,809,824 A | 3/1989 | Fargier et al. |
| 4,895,227 A | 1/1990 | Grenier et al. |
| 5,086,884 A * | 2/1992 | Gordon et al. ............. 188/71.9 |
| 5,246,091 A * | 9/1993 | Brooks, Sr. ............. 188/196 D |
| 5,348,123 A | 9/1994 | Takahashi et al. |
| 5,799,757 A | 9/1998 | Akamatsu et al. |
| 6,012,556 A | 1/2000 | Blosch et al. |
| 6,250,434 B1 | 6/2001 | Baumgartner et al. |
| 6,276,497 B1 | 8/2001 | Severinsson |
| 6,405,836 B1 * | 6/2002 | Rieth et al. ................. 188/72.1 |
| 6,684,989 B2 | 2/2004 | Berra et al. |
| 6,722,477 B1 | 4/2004 | Wolfsteiner et al. |
| 6,837,342 B1 | 1/2005 | Olschewski et al. |
| 6,840,354 B2 | 1/2005 | Grundwurmer et al. |
| 2004/0074709 A1 * | 4/2004 | Krug et al. ................. 188/72.1 |

* cited by examiner

BRAKE APPLICATION DEVICE COMPRISING AN ELECTRICALLY ACTUATED WEAR ADJUSTER

BACKGROUND AND SUMMARY OF THE DISCLOSURE

The disclosure is based on a brake application system for vehicles, particularly for rail vehicles, containing a wear adjuster constructed as a brake rod or thrust rod actuator and having a screw drive which has a threaded spindle and a nut to be screwed to the threaded spindle, as the screw parts.

A brake application system of this type is known from European Patent Document EP 0 699 846 A2. A wear adjuster for rail vehicle brakes in the form of brake rod and thrust rod actuators which, in the case of a brake pad and brake disc wear respectively, keep the brake pad play constant. This takes place by a change of length of the screw drive, in the case of thrust rod actuators, an increasing actuator length causing a reduction of the brake pad play. The drive of the known screw drive takes place mechanically by a brake linkage with a thrust rod which, in the event of an excess stroke of a brake actuator constructed as a pneumatic cylinder-piston driving gear, is operated by a rocker lever.

In the present disclosed system, at least one of the screw parts is electrically driven for the wear adjustment.

As a result of the direct electric control of at least one of the screw parts of the screw drive for the wear adjustment, the known brake linkage can be eliminated. Since the electric drive unit has a smaller size than the brake linkage, space and weight are saved. Furthermore, as a result of the electric control of the screw drive, a more precise adjusting becomes possible in comparison to a mechanical operation.

According to the present system, an electric drive unit is provided which consists of an electric motor with a gearing arranged on the output side. The gearing output is rotationally coupled with an electrically driven screw part. The electric motor may be a d.c. motor. The gearing contains a planetary gear axially adjoining the electric motor as well as one or more gearwheel stages arranged behind this planetary gearing.

A clutch by which the electrically driven screw part, in the event of the presence of an axial force originating from a braking, can be non-rotatably coupled with a non-rotatable part, for example, a housing, and otherwise can be uncoupled therefrom. As a result, the screw part loaded by the caliper levers of the brake application system by the braking power is supported on the housing and not on the electric drive unit. Thus, the electric drive unit can be smaller, which also contributes to a reduction of the size.

A slip clutch may be arranged between the electric drive unit and the electrically driven screw part. The slip clutch is constructed to slip when stop positions are reached and is otherwise coupling. One stop position is formed, for example, by the application of the brake pads on the brake disc. Another stop position is formed by a screw connection end position in which the electrically driven screw part is screwed to the stop into the other screw part or vice-versa. In the latter case, the electrically driven screw part would be rotated along with the other screw part, and the rotating movement would be undesirably transmitted to the electric drive unit. The slip clutch therefore protects the electric drive unit from impacts when the stop positions are reached in that it slips in order to permit the motor to softly and gradually conclude its rotating movement and uncouples it from torques introduced by other components. The slip clutch is preferably connected between the coupling and the electric drive unit.

The other screw part of the screw drive can be rotatably driven for the emergency and/or auxiliary release of the brake. The screw drive is then used in the sense of a combination of functions in a constructional unit, on the one hand, for the wear adjustment and, on the other hand, for the emergency and/or auxiliary release of the brake, whereby space and weight can again be saved.

These and other aspects of the present disclosure will become apparent from the following detailed description of the disclosure, when considered in conjunction with accompanying drawings.

DETAILED DESCRIPTION OF THE DRAWINGS

Figure 1:
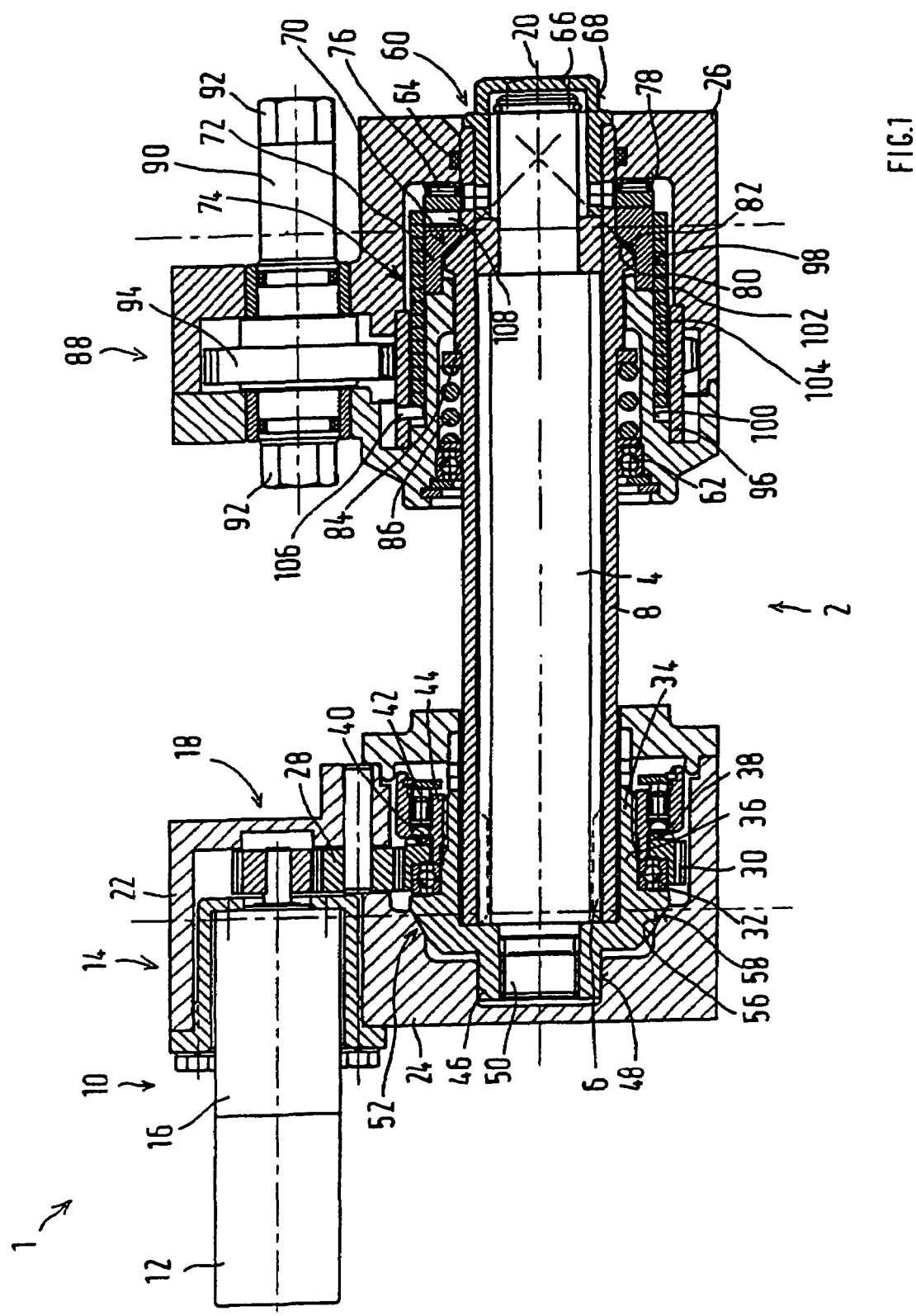
FIG. 1 is a longitudinal sectional view of a thrust rod actuator of a brake application system of a rail vehicle according to an embodiment of the present disclosure in a position of the minimal length.

For reasons of scale, FIG. 1 shows only a wear adjuster 1 in the form of a thrust rod actuator as part of an electromechanically, pneumatically or hydraulically operable brake application system which may be used for an urban railway or a subway. The thrust rod actuator, in the position illustrated in FIG. 1, is in a position of minimal length, whereby the brake pads take up a maximal distance from the brake disc.

The thrust rod actuator 1 contains a screw drive 2 which, as the screw parts, has a threaded spindle 4 and a nut 8 which can be screwed onto this threaded spindle 4 by a trapezoidal thread 6 and is constructed as a tube-type part. The trapezoidal thread 6 preferably is not self-locking. For the wear adjustment, the thrust rod actuator 1 is designed to be operated electrically. An electric drive unit 10 is provided which consists of an electric motor 12 with a gearing 14 connected behind it. The gearing output is rotationally coupled with the threaded spindle 4. As an alternative, the nut 8 or the threaded spindle 4 and the nut 8 can also be designed to be electrically driven or actuated for adjusting the wear.

The electric motor is formed, for example, by a d.c. motor 12, and the gearing 14 is formed by a planetary gearing 16 axially adjoining the d.c. motor 12 as well as by a gearwheel stage 18 connected to the output side of the planetary gearing 16. The d.c. motor 12, the planetary gearing 16 and the gear wheel stage 18 are arranged parallel to and at a radial distance from the center axis 20 of the screw drive 2 and are housed in a drive housing 22 flanged to a housing part 24, shown on the left in FIG. 1. A left caliper lever of a caliper (not shown) of the brake application system is linked to thrust rod actuator 1. A housing part 26 which, viewed in the axial direction of the screw drive 2, is opposite the left housing part 24 and the right caliper lever of the caliper is linked to this right housing part 26. Such a caliper is sufficiently known and is described, for example, in European Patent Document EP 0 699 846 A2, to whose entire disclosure content reference is made here. The spacing of the left housing part 24 and the right housing part 26 of the thrust rod actuator 1 is varied by the screw drive 2. By extending the screw drive 2 or the thrust rod actuator 1, a wear adjustment can take place and the pad play between the brake pads and the brake disc, which enlarges with time, can be reduced again and can be held at a constant value.

The gearing-output-side gearwheel 28 of the gearwheel stage 18 meshes with a screw-side gearwheel 30. Gearwheel 28 is coaxially rotatably disposed on a cylindrical projection 34 of a conical sleeve 30 by a deep-groove ball bearing 32. A slip clutch 38 arranged on the side of the screw-side gearwheel 30 pointing to the right housing part 26, couples the electric drive unit 10 with the conical sleeve 36. The slip clutch 38 contains balls 40, which are pretensioned by a defined spring pressure in grooves constructed on the face of the screw-side gearwheel 30 and which are guided in bores 42 of a ring 44 non-rotatably held on the cylindrical projection 34 of the conical sleeve 36. At torques greater than a defined slipping moment, the form closure generated by the balls 40 pressed into the grooves is overcome and the clutch 38 slips, whereby the electric drive unit 10 is uncoupled from the nut 8. By the appropriate selection of the spring parameters and of the ball-groove geometry, the slipping moment can be adapted to the momentarily existing requirements. In the present case, the clutch 38 slips when the brake application system reaches stop positions, such as the position in which the brake pads come to rest on the brake disc or the position in which the thrust rod actuator 1 is shortened to the minimal length (FIG. 1) and the threaded spindle 4 is completely screwed into the nut 8.

The driving torque transmitted by the slip clutch 38 to the ring 44 is introduced into the conical sleeve 36. A pin-shaped projection 46 on the conical sleeve 36 has a radially outer surface which forms a bearing surface of a slip bearing 48. The bearing surface is slidably and rotatably disposed in a housing-side bearing surface assigned to it. The slip bearing 48 is used as a bearing point of the threaded spindle 4, which bearing point is on the left side in FIG. 1. The threaded spindle 4, in turn, is screwed by an end-side threaded pin 50 into an internal thread existing in the projection 46 of the conical sleeve 36 and is held there in a non-rotatable manner. As a result, the conical sleeve 36 can transmit the driving torque introduced by the slip clutch 38 to the threaded spindle 4.

A cone clutch 52 contains at least two conical surfaces 56, 58, which can be stopped by mutual friction against one another and are arranged in an oblique manner viewed in the axial direction. The cone clutch 52 is in front of the electric drive unit 10, with one of the conical surfaces 56 being constructed on the left housing part 24 and the other conical surface 58 being constructed on the conical sleeve 36 screwed to the threaded spindle 4. When the threaded spindle 4 is axially loaded, the two conical surfaces 56, 58 are pressed against one another in the direction of the conical narrowing. Whereby, the respectively taken-up rotating position of the threaded spindle 4 is fixed by frictional engagement or adherence and the axial load is supported by the left housing part 24. In particular, a transmission of the axial load as a torque to the electric drive unit 10 is prevented. If, in contrast, no axial load is present, the cone clutch 52 is in the released state and the conical sleeve 36, together with the threaded spindle 4, can rotate freely with respect to the left housing part 24.

The tube-type nut 8 projects into a stepped passage opening 60 of the right housing part 26 and is rotatably disposed there by a deep-groove ball bearing 62 but is axially displaceably disposed with respect to its inner race. A sleeve 66 is non-rotatably and axially fixedly held in the end of the nut 8 which points away from the left housing part 24. An outer circumference of the sleeve 66, rests slidingly on a seal 64 received in the passage opening 60 of the right housing part 26. The end of the sleeve 66 projecting out of the passage opening 60 is equipped with an application surface 68 for a screwing tool. In addition, a slip clutch 70 couples the nut 8 with a coaxial free-wheel sleeve 72 of a lockable free wheel 74. The lockable free wheel 74 is axially displaceably held on the nut 8 and is supported by a thrust bearing 76 that may be an axial needle bearing against a radial wall 78 of the right housing part 26. The nut 8 is therefore disposed in a thrust bearing.

The slip clutch 70 may be formed by two conical gearings 80, 82 meshing with one another in the axial direction. One conical gearing 80 is constructed on a radially outer ring collar of the end of the nut 8 projecting into the right housing part 26, and the outer conical gearing 82 is constructed on the radially inner circumferential surface of the free-wheel sleeve 72.

A coil spring 86 is supported at one end on the deep-groove ball bearing 62 and at the other end on an outer step 84 of the nut 8. The nut 8 is pretensioned by the coil spring 86 against the free-wheel sleeve 72, so that the two conical gearings 80, 82 are in a mutual engagement. When a slipping moment is exceeded, the two conical gearings 80, 82 are disengaged while the nut 8 is axially displaced in the direction of the left housing part 24, whereby the nut 8 can rotate with respect to the free-wheel sleeve 72. The slipping moment of the slip clutch 70 can be adapted by the suitable selection of the spring parameters and of the conical gearings 80, 82.

In the right housing part 26, a rotary drive 88 is accommodated for the emergency release and/or the auxiliary release of the brake application system. "Emergency release" is a braking power reduction of the brake application system acted upon by braking power, for example, in the event of a failure of the brake actuator, and "auxiliary release" is a release of the brake not acted upon by braking power for maintenance work, for example, for changing the brake pads. In the present case, the rotary drive 88 is manually operated. A turning tool is applied to one of two application surfaces 92 constructed on the end side on a shaft 90. In order to cause the shaft 90 to rotate, the shaft 90 is rotatably accommodated in the right housing part 26 parallel to the center axis 20 of the screw drive 2. As an alterative, the rotary drive 88 can also be designed to be remotely or electrically actuated by a Bowden cable.

The manually caused rotation of the shaft 90 is transmitted by a gearwheel 94 shaped onto it between the two application surfaces 92 and arranged within the right housing part 26 to mesh with a toothed sleeve 96. The toothed sleeve 96 is rotatably accommodated in the right housing part 26 coaxial with the screw drive 2 and is radially spaced by an annulus 102 with respect to a housing surface 100 which is flush with the radially outer circumferential surface 98 of the free-wheel sleeve 72 and axially adjoins the circumferential surface 98 of the free-wheel sleeve 72. A coil spring 104 is coaxial with respect to the center axis 20 of the screw drive 2 and has two pin-type ends 106, 108 bent away oppositely in the radial direction. The coil spring 104 is accommodated in the annulus 102. One end 106 is form-lockingly held in a radial passage bore of the toothed sleeve 96, and the other end 108 is form-lockingly held in a radial passage bore of the free-wheel sleeve 72.

The toothed sleeve 96, the coil spring 104, the free-wheel sleeve 72 and the housing surface 100 together form a lockable free wheel as a coil spring free wheel 74, which couples the rotary drive 88 with the nut 8. More precisely, the coil spring free wheel 74 rotates the nut 8 by the rotary drive 88 in a direction against the wear adjustment and locks this rotation when the rotation of the nut 8 is not caused by the rotary drive 88. The above-described slip clutch 70 is arranged between the nut 8 and the coil spring free wheel 74.

Figure 2:
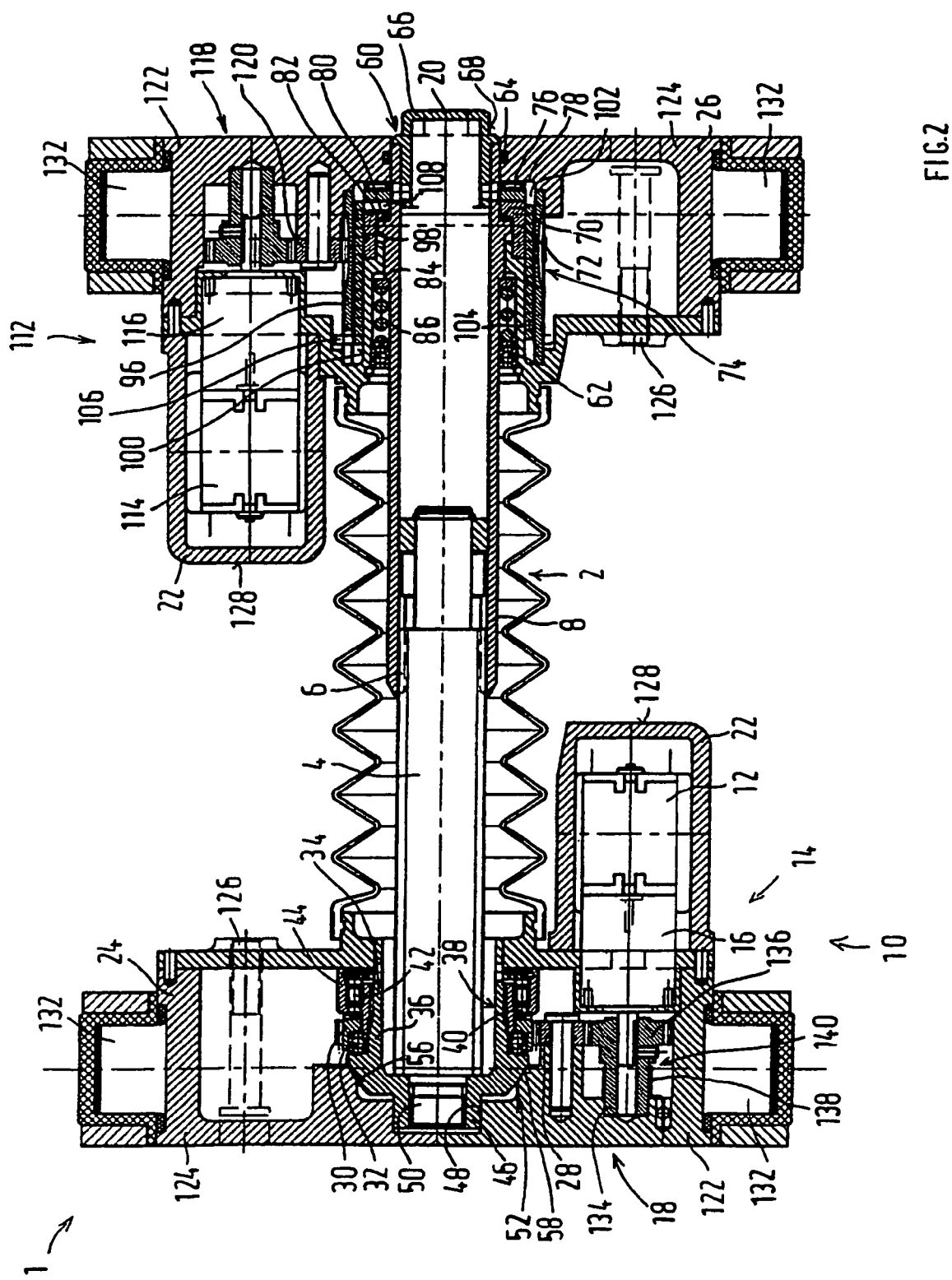
FIG. 2 is a longitudinal sectional view of a thrust rod actuator according to another embodiment in a position of the maximal length.
Figure 3:
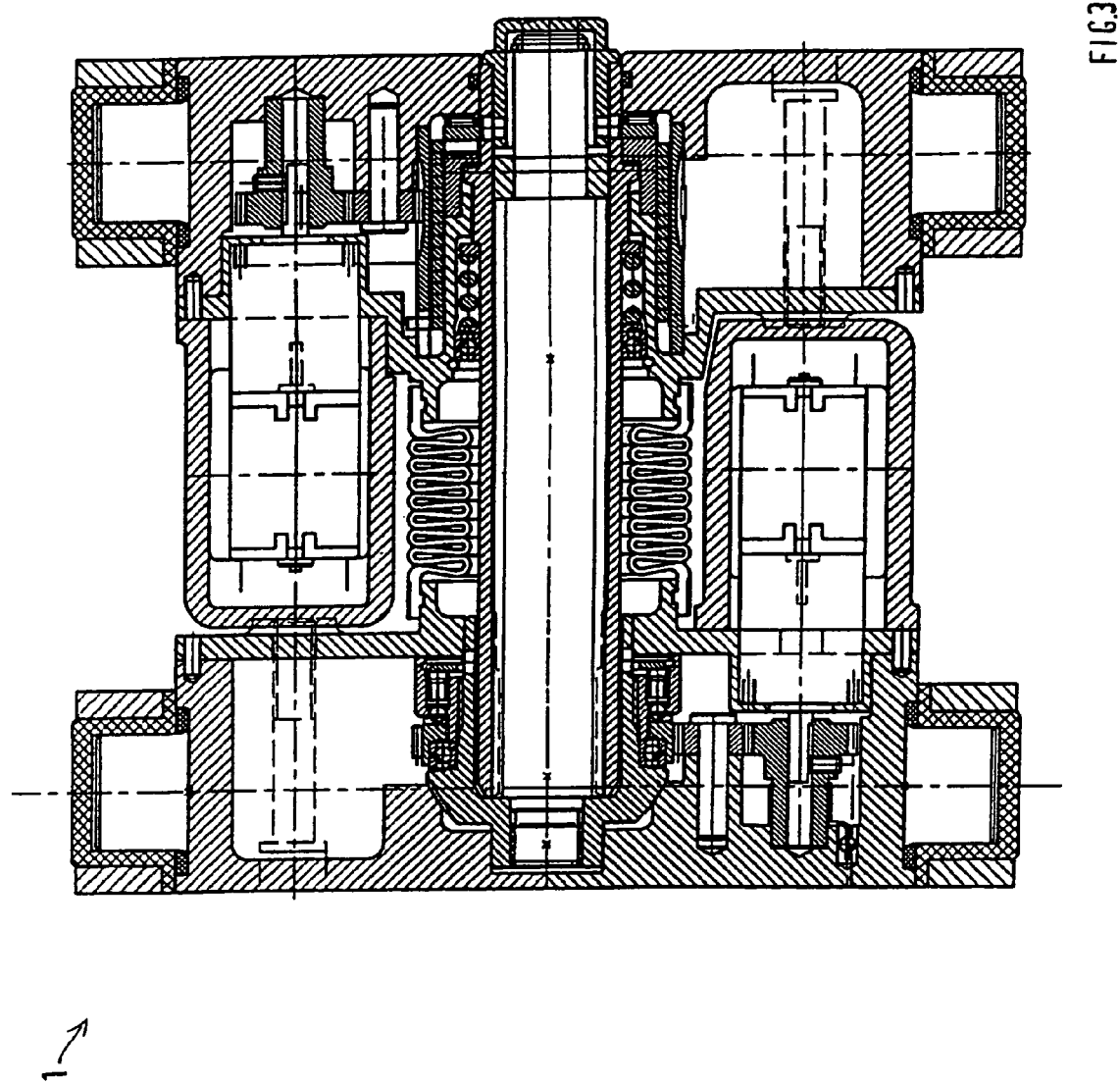
FIG. 3 is a view of the thrust rod actuator of FIG. 2 in a position of minimal length.

In the second embodiment of a thrust rod actuator 1 according to FIGS. 2 and 3, the parts which are identical to those in the preceding embodiment and have the same effect are marked by the same reference numbers.

In contrast to the above-described embodiment, the rotary drive 88 is formed by an additional electric drive unit 112 consisting of an electric motor, for example, a d.c. motor 114, of a planetary gearing 116 as well as of a gearwheel stage 118, so that two electric drive units 10, 112 may have an identical construction. As described above, the transmission-output-side gearwheel 120 meshes with the toothed sleeve 96, which, in turn, is coupled with the nut 8 by the coil spring free wheel 74.

Relative to an imagined point of intersection of the center axis 20 of the screw drive 2 and an imagined vertical center line of the thrust rod actuator 1, the two electric drive units 10, 112 are arranged essentially point-symmetrically with respect to one another. Also, they point toward one another starting from the end of the threaded spindle 4 or of the nut 8. More precisely, the drive unit 10 for the wear adjustment projects essentially from the drive-side end of the threaded spindle 4 in the direction of the drive unit 112 for the emergency and auxiliary release, and the drive unit 112 projects essentially from the drive-side end of the nut 8 in the direction of the drive unit 10 for the wear adjustment. As in the above-described embodiment, both drive units 10, 112 actuate a single screw drive 2 for the combined wear adjustment and emergency or auxiliary release.

The right and the left housing part 24, 26 each consists of housing sections 122, 124 which are essentially symmetrical relative to the center axis 20 of the screw drive 2. The drive units 10, 112 are each accommodated in a separate housing section 122. A final position sensor 126 is accommodated in each housing section 124 on the opposite sides of the center axis 20. The final position sensor 126 is situated opposite a face-side surface 128 of the drive housing 22 of the respectively other electric drive unit 10, 112. The final position sensors may be mechanical final position switches 126. They are each actuated by engaging the face-side surface 128 of the drive housing 22 of the opposite drive unit 10, 112 when reaching the position illustrated in FIG. 3, in which the thrust rod actuator 1 has moved in to the minimal length. The actuation of switches 126 supply a signal to a control device, which is not shown. At their ends pointing away from one another, the two housing sections 122, 124 of each housing part 24, 26 are in each case provided with one receiving device 132 for bolts, by which one caliper lever respectively of the caliper is linked to each housing part 24, 26.

Furthermore, a coil spring 138 of another coil spring free wheel 140 is arranged on a cylindrical projection 134 of the planetary-gearing-side gearwheel 136 of the gearwheel stage 18 assigned to the drive unit 10 for the wear adjustment. This coil spring free wheel 140 blocks a rotation of the gearwheel 136 in the direction against the wear adjustment and permits it to run freely in the opposite rotating direction.

This means that the free wheel 140 between the drive unit 10 and the housing part 24 permits a rotation of the drive 10 only in the direction in which the thrust rod actuator 1 is lengthened.

Such a coil spring free wheel 140 exists also in the case of the above-described embodiment but is not shown there. In the event of an effective control of the drive unit 10, for example, as a result of a software defect, or during a drive with a released brake, an unwanted shortening of the thrust rod actuator 1 is therefore not possible. Finally, the slip clutch 70 arranged between the free wheel sleeve 72 and the nut 8, instead of being formed by two conical gearings, is formed by two side face gearings 80, 82 meshing with one another as a result of spring pressure.

As a result of the described construction of the thrust rod actuator 1 according to the embodiments illustrated in FIG. 1 and FIGS. 2 and 3, specifically a single screw drive 2, with one screw part respectively is coupled with a separate drive unit, which is independent of the other drive unit, the brake pad wear can be corrected, and the brake can be released for emergencies and/or in an auxiliary manner. Specifically, the threaded spindle 4 is coupled with one electric drive unit 10, and the nut 8 is coupled with the manual rotary drive 88 or with the other electric drive unit 112.

Based on this background, the method of operation of the thrust rod actuator 1 is as follows:

The wear adjustment, that is, the reduction of the brake pad play, which exists between the brake pads and the brake disc and which has become too large as a result of wear, takes place in the braking-power-free brake release position. For this purpose, the d.c. motor 12 of the electric drive unit 10 provided for the wear adjustment is controlled for a predetermined time and causes the threaded spindle 4 to rotate in one rotating direction by the slip clutch 38 closed in the case of a driving torque which is smaller than the slipping moment. During the rotating movement, the threaded spindle 4 is screwed out of the nut 8 and the thrust rod actuator 1 is thereby lengthened, which results in a reduction of the brake pad play. FIG. 2 shows the thrust rod actuator 1 in a position in which it is moved out to its maximal length. Since the screw drive 2 is thereby loaded by only very low axial forces, the cone clutch 52 is in the released position, so that the threaded spindle 4 can rotate freely. The nut-side coil spring free wheel 74 blocks a rotating-along of the nut 8, which is not secured against a rotation per se. Rotation of the nut 8 is transmitted by the slip clutch 70 to the free-wheel sleeve 72 and from there to the coil spring 104 which then pulls tight and establishes a frictionally engaged connection between the free-wheel sleeve 72 and the housing surface 100. Thus, the nut 8 is non-rotatably supported on the right housing part 26.

During a braking, the bearing pressure force resulting from the braking power existing at the brake pads and transmitted by the hinged caliper levers of the caliper to the thrust rod actuator 1 and acting there in the axial direction could not be supported on the screw drive 2 because the trapezoidal thread 6 between the threaded spindle 4 and the nut 8 does not have a self-locking construction. As a result, the thrust rod actuator 1 would be shortened under the influence of the axial pressure force and causes an undesirable loss of braking power. However, the cone clutch 52 closes under the effect of the axial load by the pressing-together of the mutually assigned conical surfaces 56, 58 in a frictionally engaged manner and establishes a non-rotatable connection between the threaded spindle 4 and the left housing part 24. On the other hand, the nut-side slip clutch 70 constructed as a conical gearing 80, 82 (FIG. 1) or as a side face gearing 80, 82 (FIG. 2, FIG. 3) remains closed under the axial load and transmits the moment of reaction to the coil spring 104 which then pulls tight and supports the moment of reaction at the right housing part 26. As a result, there is no shortening of the thrust rod actuator 1 and thus no unintended loss of braking power can occur during a braking operation.

If a fault occurs, in the case of a brake actuator, which generates the braking power of the brake application system, or in its control, which has the result that the brake actuator can no longer release the brake acted upon by the braking power, this brake has to be subjected to an emergency release. For the emergency release of the brake, the shaft 90 of the rotary drive 88 (FIG. 1) is rotationally operated, for example, by the application of a screwing tool to one of the application surfaces or by a Bowden cable or the electric drive unit 112 is controlled for the emergency release and/or auxiliary release from an engineers cab of the urban railroad or subway controlled. Specifically, the coil spring 104 is rotated in a direction which expands the coil spring 104. As a result, the previously existing frictional engagement between the free-wheel sleeve 72 and the housing surface 100 is eliminated. Thus, the nut 8 has a free run in this rotating direction. The coil spring 104 can therefore transmit the rotating movement introduced into it by the toothed sleeve 96 to the free-wheel sleeve 72. This rotation is transmitted to the now freely running nut 8 by the closed slip clutch 70. As a result, the thrust rod actuator 1 is shortened and the braking power is reduced. The thrust rod actuator 1 can thereby be shortened to the minimal length illustrated in FIGS. 1 and 3 in which the nut 8 on the face side comes in contact with the bottom of the conical sleeve 36 and the final position switches 126 are actuated.

If, for maintenance work, the brake is to be moved into a position in which the brake pads are at a maximal distance from the brake disc, for example, for exchanging the brake pads, an auxiliary release of the brake can also take place by rotatory drive 88 (FIG. 1) or by the electric drive unit 112 for the emergency release (FIG. 2, FIG. 3) in the manner described above. The torque is limited which can be transmitted by the nut-side coil spring 104 expanded by the driving torque and is subjected to a bending stress, in the cases in which the screw drive 2 is stiff, for example, because of icing. In this case, the nut 8 is rotated directly for shortening the thrust rod actuator 1. This takes place in the braking-power-free state by applying a screwing tool to the application surface 68 of the sleeve 66 non-rotatably connected with the nut 8. The nut 8 is manually rotated in a direction in which the thrust rod actuator 1 is shortened to the minimal length illustrated in FIG. 1 and FIG. 3. The torque must be so large that the slip clutch 70 arranged between the free-wheel sleeve 72 and the nut 8 can slip, while the coil spring 104 of the coil spring free wheel 74 blocks the free-wheel sleeve 72 in this direction. In this case, the nut 8 is displaced sufficiently away from the free-wheel sleeve 72 in the axial direction that the two conical gearings 80, 82 (FIG. 1) or the two side face gearings 80, 82 (FIG. 2, FIG. 3) are disengaged.

The disclosure is not limited to thrust rod actuator 1 of brake application systems but can also be used for brake rod adjusters.

Although the present disclosure has been described and illustrated in detail, it is to be clearly understood that this is done by way of illustration and example only and is not to be taken by way of limitation. The scope of the present disclosure is to be limited only by the terms of the appended claims.

The invention claimed is:

1. A brake application system for vehicles, particularly for rail vehicles, comprising:
   a wear adjuster constructed as a brake actuator;
   a screw drive of the wear adjuster having a threaded spindle as a first screw part and a nut as a second screw part, the nut being configured to be screwed to the spindle;
   at least one of the two screw parts is electrically driven for wear adjusting by an electric drive unit;
   wherein the electric drive unit includes an electric motor having a gearing arranged on an output side, and a gearing output of the gearing is rotationally coupled with the at least one screw part that is electrically driven;
   a slip clutch located between the electric drive unit and the at least one electrically driven screw part, wherein the slip clutch slips when at least one of two stop positions has been reached and otherwise the slip clutch is coupled; and
   wherein a first of the stop positions is formed by an application of brake pads to a brake disc and a second of the stop positions is formed by an end position in which the at least one electrically driven screw part is screwed into the other screw part of the two screw parts to the second stop position or the other screw part of the two screw parts is screwed into the at least one electrically driven screw part to the second of the stop positions.

2. The brake application system according to claim 1, wherein the electric motor comprises a d.c. motor, and the gearing comprises a planetary gearing axially adjoining the electric motor as well as one or more gearwheel stages arranged on an output side of the gearing.

3. The brake application system according to claim 2, including a clutch in front of the electric drive unit of the electrically-driven screw part, by which clutch, in the event of the presence of an axial force originating from a braking, the electrically driven screw part can be non-rotatably coupled with a non-rotatable part and can otherwise be uncoupled from the non-rotatable part.

4. The brake application system according to claim 3, wherein the clutch includes a cone clutch having at least two conical surfaces which can be stopped as a function of friction against one another and are arranged obliquely when viewed in the effective direction of the axial force.

5. The brake application system according to claim 4, wherein a first of the two conical surfaces is constructed on a housing and a second of the two conical surfaces is constructed on a conical sleeve non-rotatably connected with the electrically driven screw part.

6. The brake application system according to claim 5, including a threaded pin of the electrically driven screw part screwed into an internal thread constructed in a bottom of the conical sleeve.

7. The brake application system according to claim 6, including a gearwheel meshing with a gearing-output-side gearwheel of the gearing and being coaxailly rotatably disposed on a cylindrical projection of the conical sleeve.

8. The brake application system according to claim 4, wherein the slip clutch is between the cone clutch and the electric drive unit.

9. The brake application system according to claim 8, wherein the slip clutch contains balls pretensioned by a defined spring pressure in grooves, the grooves being constructed on a face of the gearing-output-side gearwheel, and the balls being held in bores of a ring non-rotatably held on a cylindrical projection of a conical sleeve.

10. The brake application system according to claim 1, wherein, at least during the electric driving of the electrically driven screw part in one rotating direction for the wear adjustment, the other screw part of the two screw parts is held in a non-rotatable manner.

11. The brake application system according to claim 10, wherein the other screw part of the screw drive can be rotatorily driven for the emergency and/or auxiliary release of the brake.

12. The brake application system according to claim 11, wherein the other screw part is coupled with a rotary drive for the emergency and/or auxiliary release by a lockable free wheel, and the lockable free wheel permits a rotation of the other screw part by the rotary drive in a direction against the wear adjustment and is constructed for blocking this rotation if it is not caused by the rotary drive.

13. The brake application system according to claim 12, wherein the electric drive unit of the electrically driven screw part is actuated independently of the rotary drive coupled to the other screw part.

14. The brake application system according to claim 13, wherein the rotary drive is designed to be remotely or electrically actuated directly by hand by a Bowden cable.

15. The brake application system according to claim 14, wherein the other screw part is coupled by a slip clutch with the rotary drive and has an application surface for the application of a rotating tool.

16. The brake application system according to claim 1, wherein the electrically driven screw part is the threaded spindle, and the other screw part is the nut.

17. The brake application system according to claim 12, wherein the lockable first free wheel includes a coil spring free wheel between a cylindrical wall of a non-rotatable part and a sleeve rotating along with the other screw part.

18. The brake application system according to claim 17, including a second free wheel between the drive unit and a non-rotatable part which permits only a rotation of the drive unit in a direction in which the brake actuator is lengthened.

* * * * *